Jan. 28, 1941. G. WESTOVER 2,229,690
LINE PHOTOTYPOGRAPH
Filed June 7, 1938 8 Sheets-Sheet 1
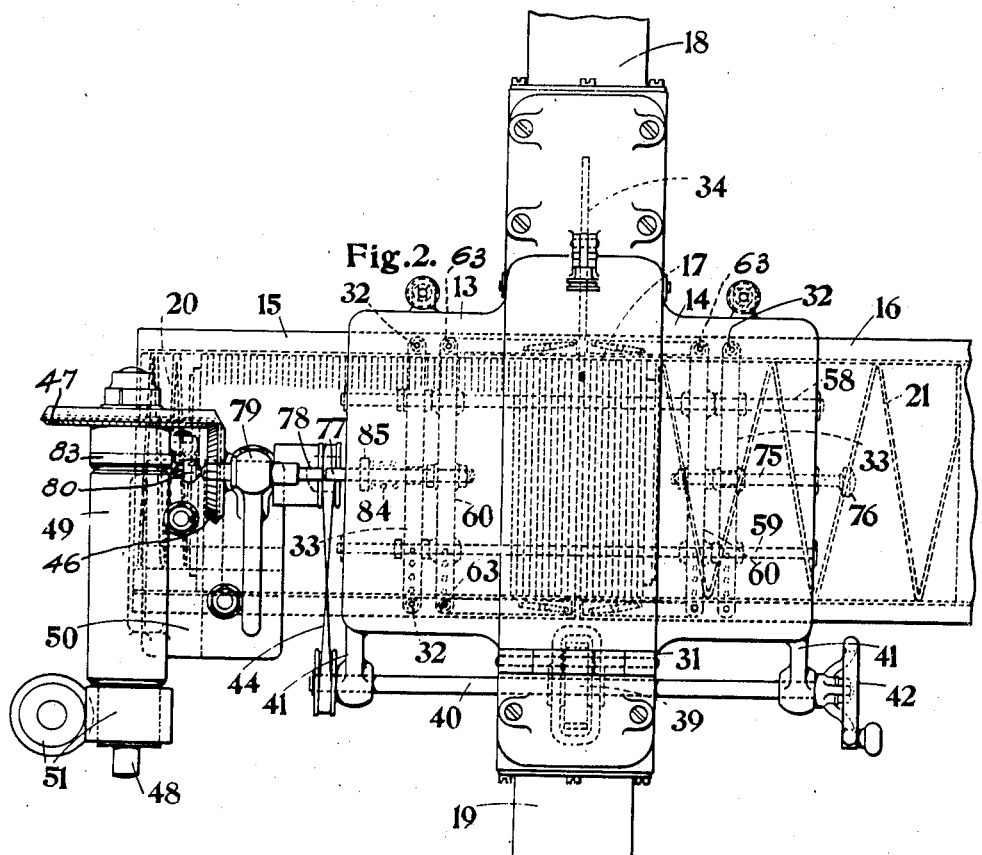
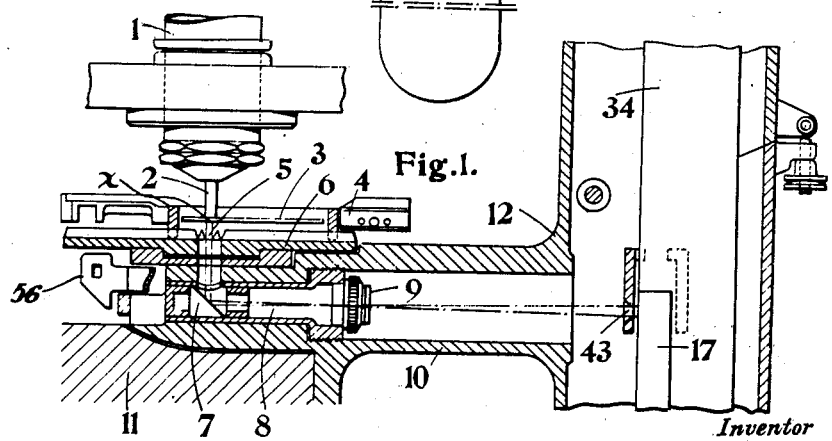
Fig. 1.
Inventor
G. Westover
by
W. E. Evans
Attorney.

Jan. 28, 1941.  G. WESTOVER  2,229,690
LINE PHOTOTYPOGRAPH
Filed June 7, 1938  8 Sheets-Sheet 2

Inventor
G. Westover:
by
W. E. Evans
Attorney.

Jan. 28, 1941.　　G. WESTOVER　　2,229,690
LINE PHOTOTYPOGRAPH
Filed June 7, 1938　　8 Sheets-Sheet 3
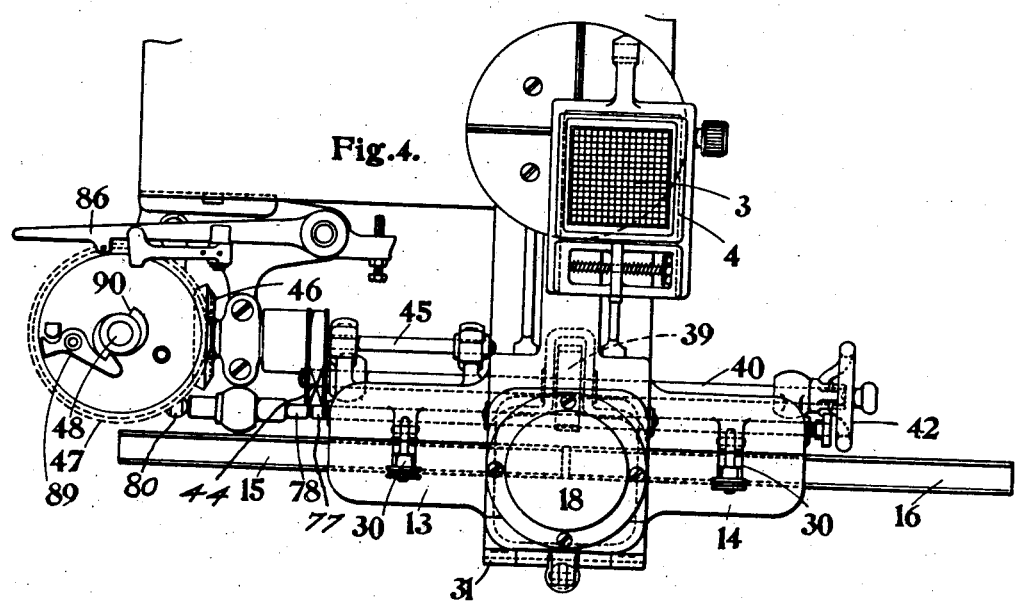
Fig.4.
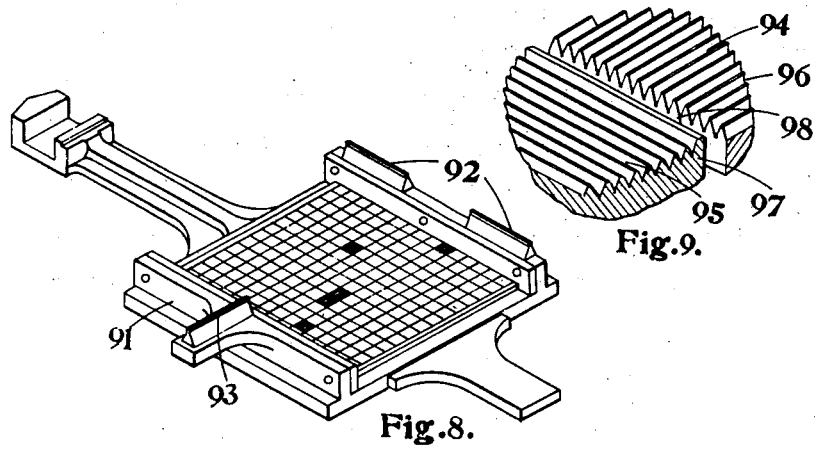
Fig.8.
Fig.9.
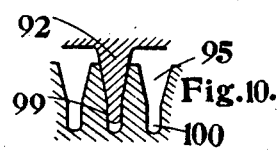
Fig.10.
Inventor
G. Westover:
by
W. E. Evans:
Attorney.

Jan. 28, 1941.　　　G. WESTOVER　　　2,229,690
LINE PHOTOTYPOGRAPH
Filed June 7, 1938　　　8 Sheets-Sheet 4

Inventor
G. Westover:
by
W. E. Evans
Attorney.

Jan. 28, 1941.　　G. WESTOVER　　2,229,690
LINE PHOTOTYPOGRAPH
Filed June 7, 1938　　8 Sheets-Sheet 5

INVENTOR.
George Westover
by Morgan Finnegan and Durham
Attorneys.

Jan. 28, 1941.  G. WESTOVER  2,229,690
LINE PHOTOTYPOGRAPH
Filed June 7, 1938  8 Sheets-Sheet 6

INVENTOR.
George Westover
by Morgan Finnegan and Durham
Attorneys

Jan. 28, 1941.    G. WESTOVER    2,229,690
LINE PHOTOTYPOGRAPH
Filed June 7, 1938    8 Sheets-Sheet 7
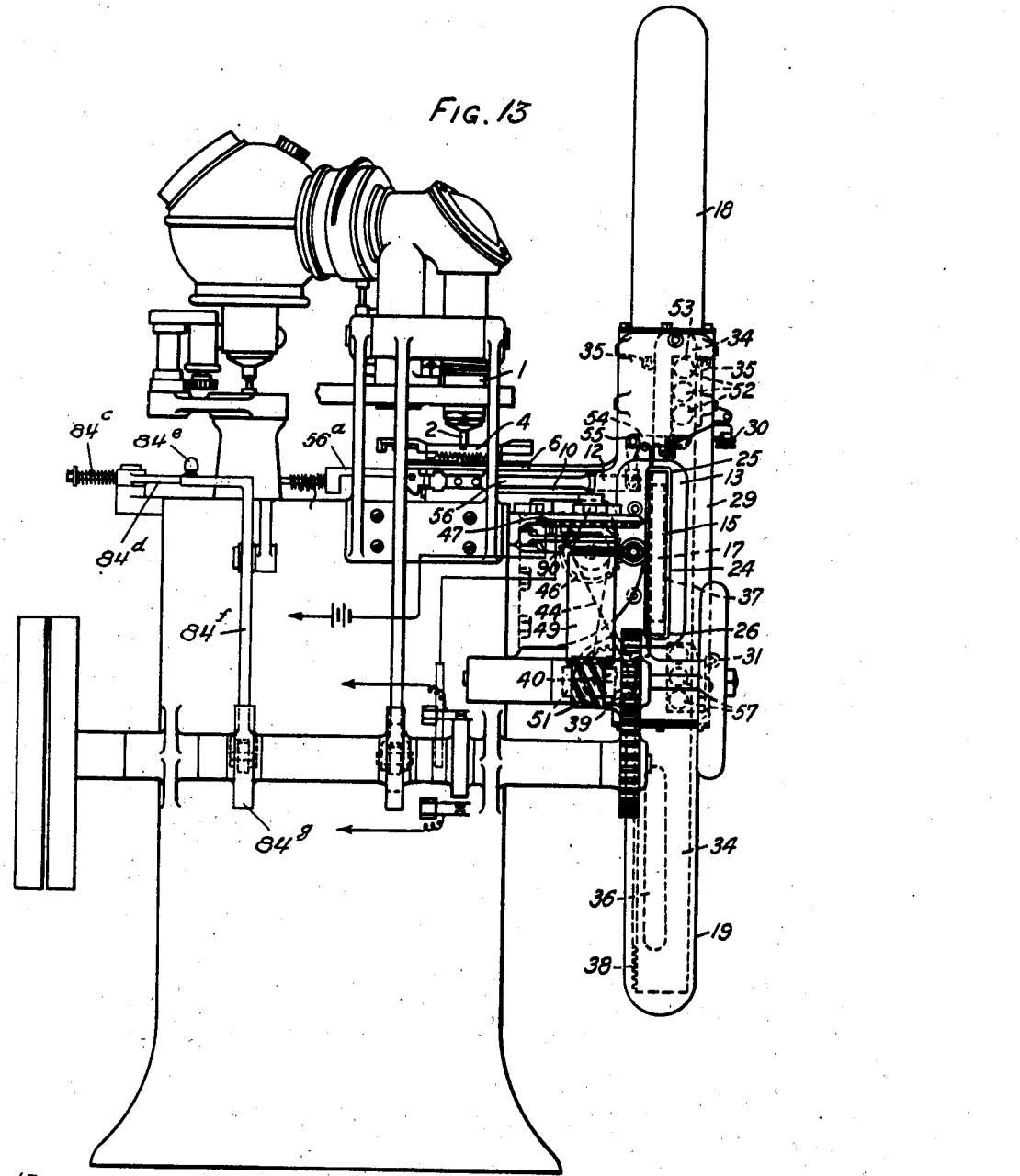
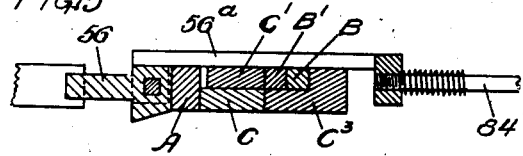
INVENTOR.
George Westover
By Morgan, Finnegan & Durham
Attorneys

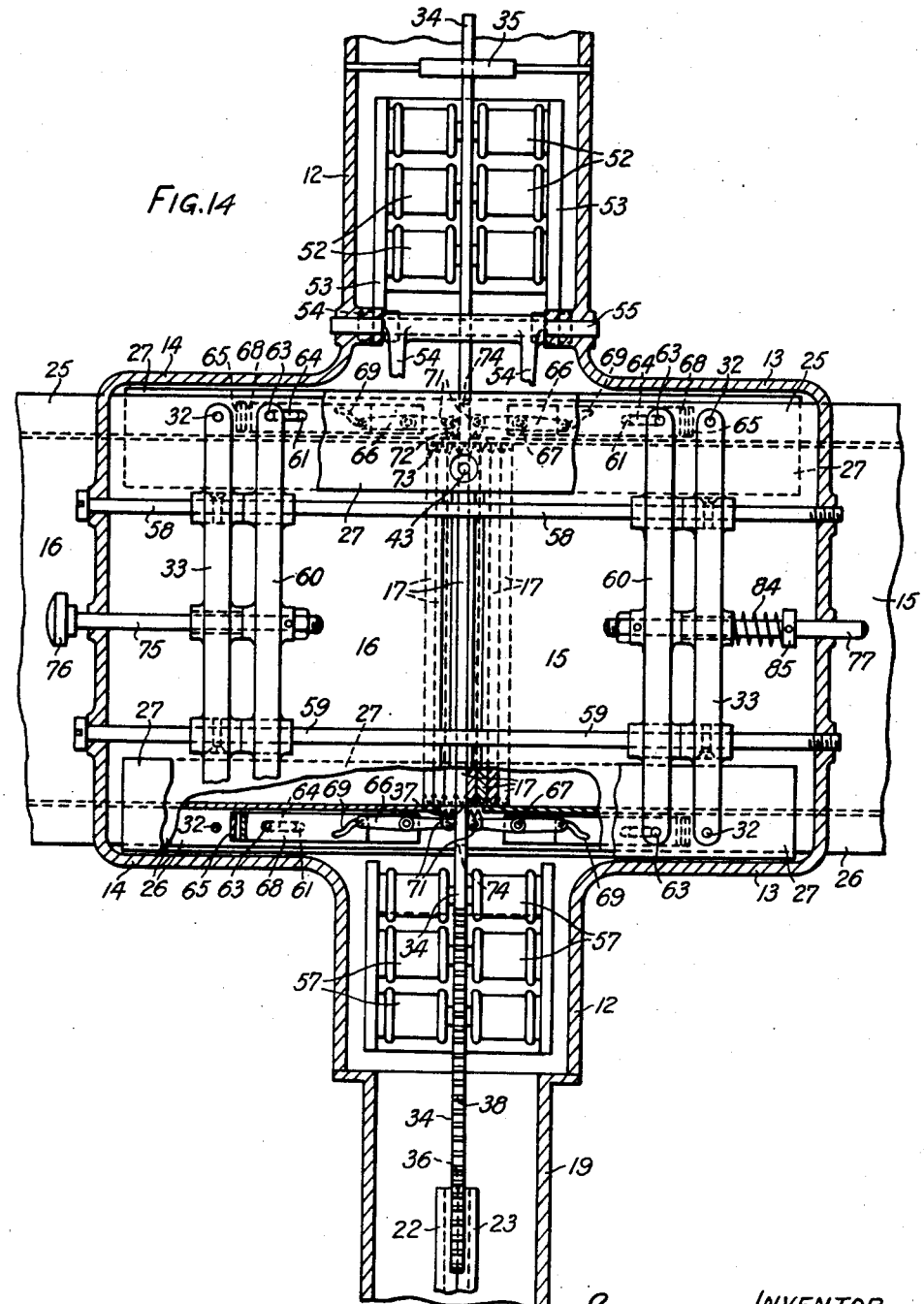

Patented Jan. 28, 1941

2,229,690

UNITED STATES PATENT OFFICE 2,229,690

LINE PHOTOTYPOGRAPH

George Westover, Balcombe, England

Application June 7, 1938, Serial No. 212,260
In Great Britain June 9, 1937

19 Claims. (Cl. 95—4.5)

The invention relates to new and useful improvements in typographic composing machines, and more particularly to such improvements in machines operating under the control of a previously-composed record sheet or strip to photographically impress justified lines of typographic characters on line-unit bars, which are later assembled to produce typographic printing designs.

The invention consists in the novel mechanisms, elements, and combinations disclosed in the specification and pointed out in the appended claims.

Objects and advantages of the invention are set out in part hereinafter, and in part will be obvious to those skilled in the art or may be learned by practice with the invention.

In certain respects the present invention is an improvement upon the invention described and shown in my copending application Ser. No. 203,-881, filed April 22, 1938, which corresponds generally to my British Patent No. 499,859, but in other respects the present invention is a modification of the invention described and shown in my copending application and British patent.

The accompanying drawings, referred to herein and constituting a part hereof, illustrate two mechanical embodiments of the invention.

Of the drawings:

Figure 1 is a part sectional elevation of the optical system of the apparatus according to the invention as applied to composition by photographic projection with constant ratio of projection.

Figures 2, 3 and 4 are front elevation, side elevation and plan respectively of the general arrangement of the apparatus.

Figures 8 and 9 are detail perspective views of the negative locating means.

Figure 10 is an enlarged sectional elevation of a detail of the locating means.

Figure 13 is an elevation of the machine viewed from the drive shaft side.

Figure 14 is an enlarged sectional elevation showing in detail the traversing bars for effecting the line bar feed from the magazine to the carrier, and from the carrier to the storage magazine, and also the solenoids for control of the line bar carrier, showing in section the casing for the magazines and the line bar feed.

Figure 15 is a sectional view on line 3, 3 of Fig. 11, showing the relation of the normal, transfer and justifying wedges to the means for intermittently feeding the line bar unit.

Figure 3:
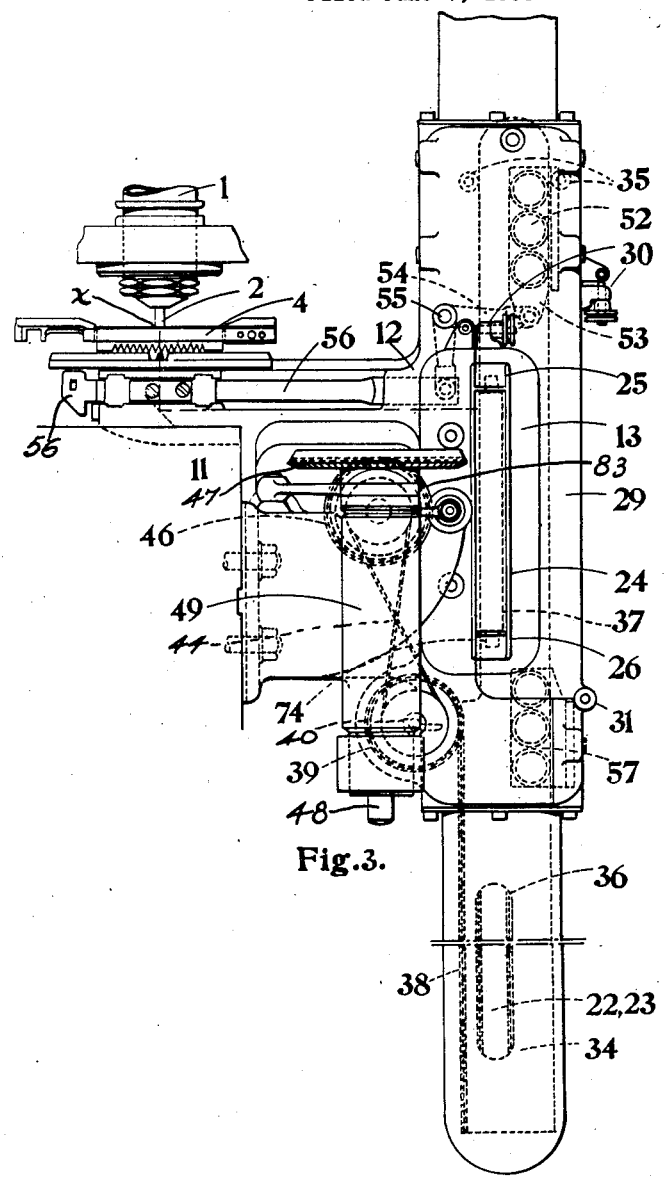
Figure 5:
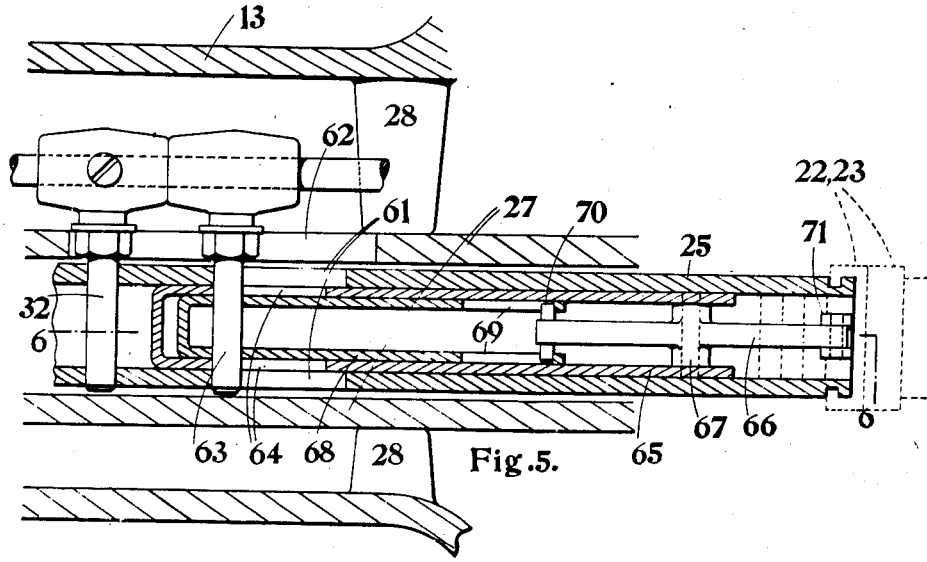
Figure 5 is a sectional plan view of the means for feeding the slugs laterally into the exposure position.

Objects of the invention are to provide a typographic composing machine, of the phototypograph class, adapted to impress by light action upon a sensitized surface of a line-unit bar, of preferably translucent or transparent material, a line of justified typographic characters, one line of characters to each such line-bar unit, the line-bar units later being developed and, after correction and revision, assembled into page form and used in making printing plates or forms for use in various processes of printing, such as rotogravure, offset, metal planographic and the like; to provide such a machine wherein unexposed line-unit bars are stored in a light-proof receiving magazine, are fed automatically one at a time to be impressed with a line of typographic characters, and then are automatically stored in a light-proof receiving magazine, in page sequence, and are later removed and developed; to provide such a machine wherein the typographic characters of a justified line are photographed on to the sensitive surface of the line-unit bar a letter at a time, under the control of a previously composed and justified record strip; to provide such a machine wherein the sensitized line-unit bar is automatically delivered from the light-proof magazine into a carrier, the carrier with the line-bar is fed longitudinally between the photographing of successive characters proportionately to the width of the characters and of inter-word spaces, to impress the justified line upon the line-unit, and the bar is then automatically delivered into the light-proof receiving magazine; to provide such a machine wherein all the operations, including the supply of the line bar to the carrier, the step by step advancement of the carrier, the sequential photographing of the characters on the line bar unit, the return of the carrier to bring the line bar in register with the magazines, and the transfer of the line bar to the receiving magazine, are all effected automatically under control of the record strip. To these ends, there are employed separate and independently movable line-unit bars, on each of which typographic characters, symbols and blank spaces are separately reproduced by photographic projection or photographic contact to form separate justified lines thereon from a movable master plate. Mechanism is provided for initially positioning each line-unit bar in a carrier or holder and the latter is variably advanced step by step in accordance with the width of each character or the like or space reproduced on the line-unit bar in the carrier.

Mechanisms are provided also for variably advancing the carrier step by step and such mechanisms are also controlled from the record strip which selectively positions the master plate. The said slugs or line-unit bars are stored in a delivery compartment of a magazine and the aforesaid carrier is mounted to move between the delivery chamber and a receiving chamber for finished or exposed slugs. When the composition of a line unit has been completed, the carrier is returned to the initial position for the extraction of a composed slug and the insertion of a fresh one by driving mechanism controlled from the record strip. Mechanism also under the control of the record strip is provided for feeding the foremost blank slug in the magazine to the carrier.

The invention is preferably applied to composition by photographic projection. The projection system affords greater freedom in design than the contact system; more than one size of image can be obtained from a given master plate by varying the distance between the lens and the master plate and between the lens and the sensitized surface on the slug and relatively large sizes of image can be produced from a master plate which lasts indefinitely. On the other hand in the contact system no lens is required.

The line-unit may be of a thermoplastic material, such as glass or Celluloid, or it may be of metal. Preferably the units are in the form of rectangular prisms, cast or moulded of transparent plastic material such as a synthetic resin, one of the flat faces of each prism being subsequently coated with a photographic emulsion.

Various methods may be adopted for controlling the period of exposure. Thus a shutter may be fitted in any convenient position between the source of illumination and the master plate as described in British Patent 499,859. Alternatively the illuminant may be switched on and off by an electrical system of control.

It will be understood that the foregoing general description, and the following detail description as well, are exemplary and explanatory but are not restrictive of the invention.

The invention is adaptable to the type casting and composing machine covered by U. S. Patent No. 625,998.

In such an application certain elements of said machine are discarded while certain other elements are retained in whole and still other elements are retained and somewhat modified to suit the new elements introduced.

Those parts of the machine referred to which are eliminated entirely, include the mould blade, the casting pot and galley with their controls and operating mechanism, with the exception of the cam disc 319 (Figs. 2 and 72) which is retained with its pawl and pawl release lever.

The disc retained is modified as hereinafter disclosed, to control the movement of the unit bar carrier.

A master negative with its carriers and a light carrying tube are substituted for the matrix with its carriers and the matrix centering rod, and function in substantially the same manner, receiving their vertically reciprocating movement from a similar system of levers actuated by a cam on the main driving shaft as those used for the substituted parts.

The master negative, with its carriers, is fully disclosed in Figures 4 to 9 of British Patent No. 499,859, together with the means for vertical movement of the carriers and light tubes and the control of the light shutter, Figs. 2, and 12 to 15.

The record strip feeding mechanism with its air connections to the primary controller stop pins, as well as the pins controlling the normal, transfer and justifying wedges and the pawl trip lever are retained.

The system of lever operated jaws for engaging the primary controller stop pins, the translation of the matrix carriers, and for engaging the projections of the normal and justifying wedges, together with their connections to the actuating cam on the main driving shaft are retained.

This system of jaws and levers is shown in Figs. 22, 23, and 25 to 33 of the above patent.

The normal, transfer and justifying wedges with their selective means from the record strip and their connections to the lever imparting vertical movement to the matrix carrier, together with the matrix centering mechanism through the primary controller or fixed gage, the primary positioning or gaging means, the secondary positioning or gaging means, and the translating devices are retained and utilized to position a character of the master plate at the light locus and to justify the line.

The main driving shaft is retained together with such cams, levers and links as are necessary for the vertical movement of the master negative and light control, the character spacing of the line bar, the movement of master plate carriers and locking means, and movement of transfer wedges.

Figure 11:
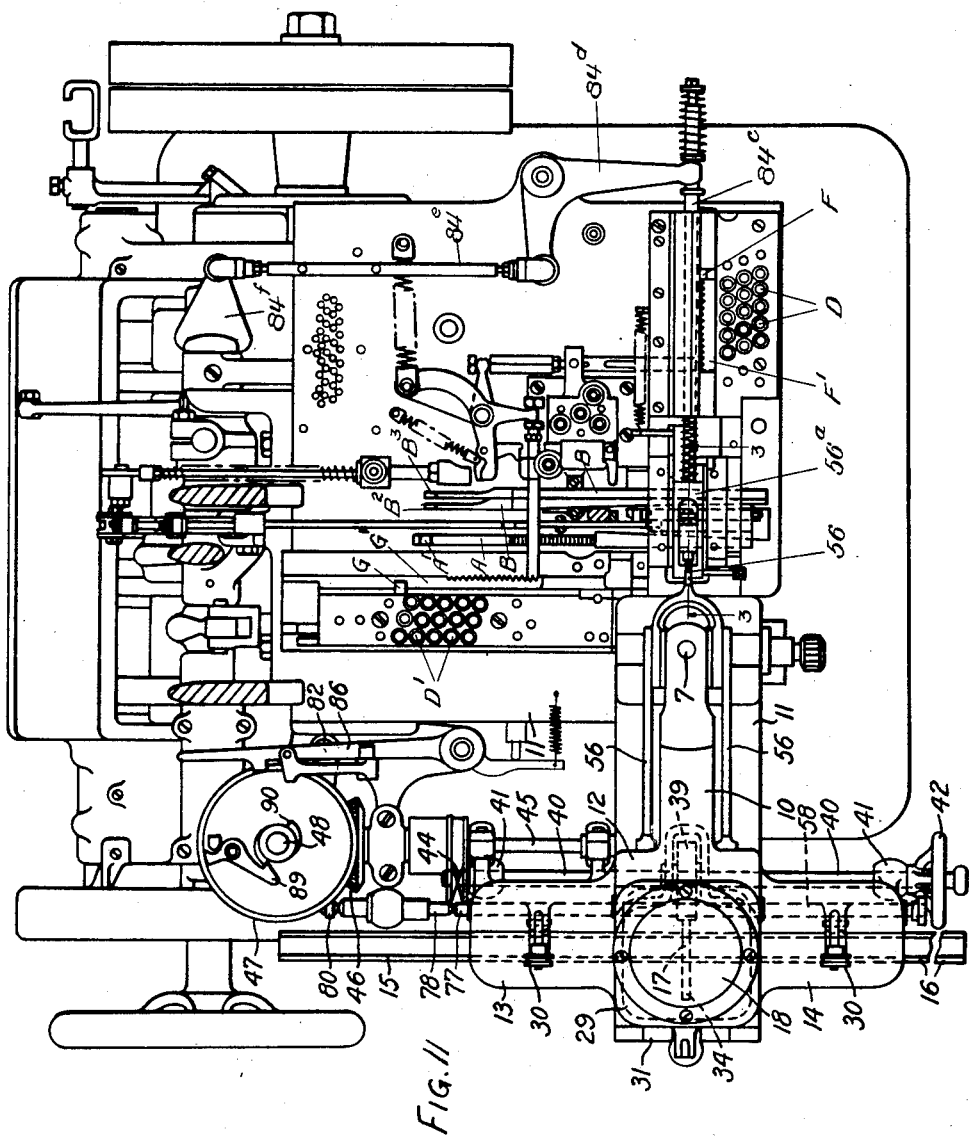
Figure 11 is a plan view showing the unit bar magazines with their housing and the means for effecting intermittent movement of the unit bar carrier from the main driving shaft; also the system of wedges for character spacing and line justification, the main actuating arm and its pivotal supports being shown in section.
Figure 12:
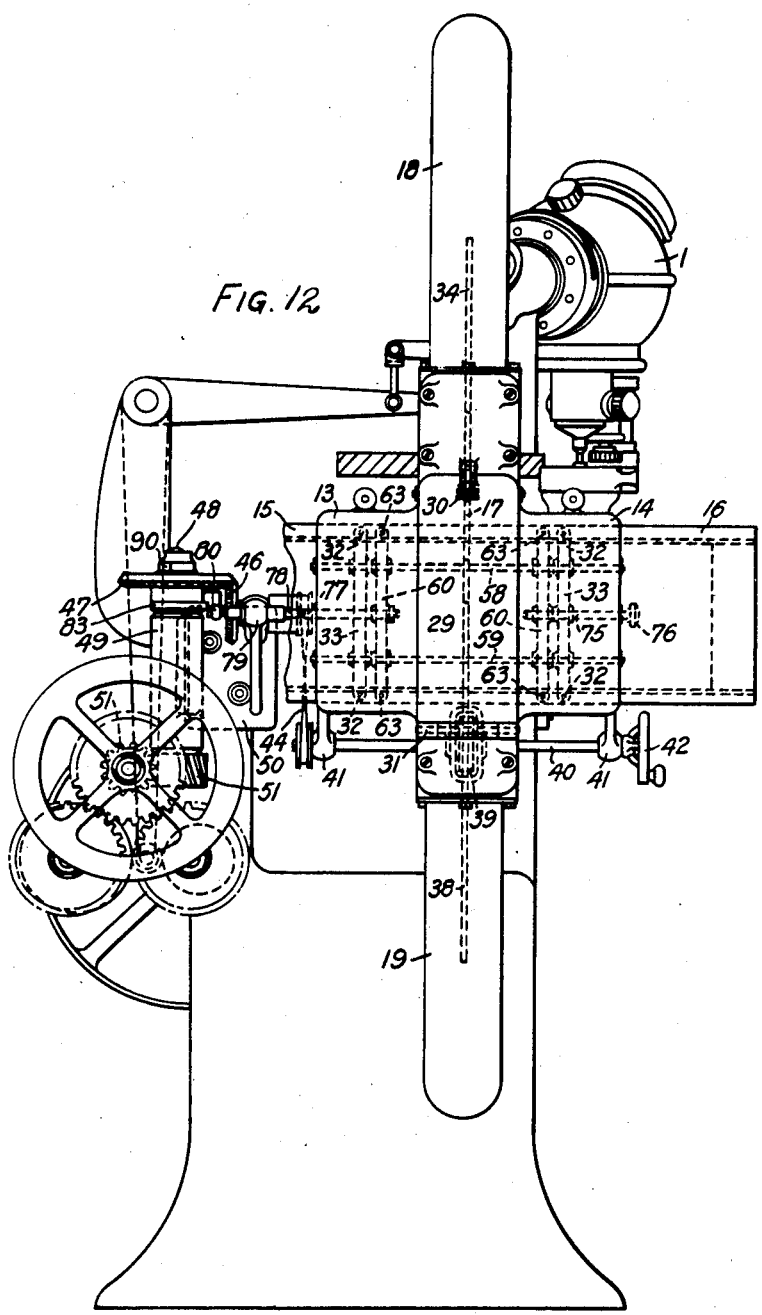
Figure 12 is an elevation of the machine as viewed from the left of Fig. 11, the carrying bridge being shown in section.

In the accompanying drawings, Fig. 11, the jaws to engage the primary gage pins, translating means and wedges are omitted for the sake of clearness.

The sliding abutment block, which in the above patent is connected to the mould blade, is retained and connected to bar 56 as hereinafter set forth.

The movement of the abutment block is derived from a cam and system of levers and rods similar to that of the above patent where it is shown in Figs. 2, 6, 22, 23 and 44.

Referring now in detail to the embodiment of the invention illustrated by way of example in the accompanying drawings, the tube 1 projects light intermittently in synchronism with the feed movements of the apparatus under the control of a perforated record pattern or strip through a resiliently mounted tubular end piece 2 then through the master plate 3 held in the holder 4 and through a central opening 5 provided in the lower fixed part 6 of the holder locating means on to a prism 7 of triangular section mounted at one end of a lens tube 8, whence the beam of light is projected through a lens 9 mounted at the end of the tube 8. The characters and other typographic symbols on the master plate are arranged in rows and columns and holder 4 is movable in two directions in one plane by mechanism under control of the record strip to position a selected character or the like in the proper position for exposure, as disclosed in British Patent No. 499,859.

To obtain a blank space in the line corresponding to the usual spaces and quads of typographical practice, a portion of the negative may be maintained blank, that is to say, having no character delineated thereon, or alternatively the lighting system may be so controlled that no exposure is made at the position in which a blank space is required in the line. The lens tube 8 is screw-threaded into a horizontally disposed tube 10 secured to the main stand 11 of the apparatus, the tube 8 extending laterally to merge into a casing 12. The point of contact of end piece 2 with the master plate 3 determines the exposure locus X of Fig. 1.

The casing 12 is of cruciform shape comprising horizontally disposed parts 13 and 14 serving to house the magazines 15 and 16 within which are carried the slugs 17 and upper and lower vertically extending substantially tubular parts 18 and 19 respectively secured as by screws at mid-positions respectively on the top and bottom faces of the horizontal parts 13 and 14 of the casing 12. The magazines 15, 16 are of rectangular flat section and carry the slugs 17 in juxtaposed relation with springs 20, 21 inside the magazines, tending to exert a lateral pressure on the slugs to move them out of the magazines.

The magazines are provided with slidable covers 22, 23 (shown in dotted lines in Figure 5), and are secured in end-to-end relation with the covers in contact respectively in the parts 13 and 14 with the ends of the magazines projecting through lateral slots or openings 24 formed in the end walls of the parts 13, 14.

The magazines are formed at the upper and lower ends with parallel projecting flanges 25, 26 forming troughs of channel section respectively at the top and bottom of the magazines.

Strips of angle iron 27 are mounted on bosses 28 on the front and rear walls of the parts 13 and 14 of the casing 12 at top and bottom to form a guide or support for the magazines in the casing.

The magazines 15, 16 are inserted in the casing by swinging open the front wall 29 of the horizontally disposed parts 13, 14 after unscrewing the locking screws 30, the front wall 29 being hingedly mounted at 31.

The magazines 15, 16 are secured immovably within the parts 13, 14 by means of upper and lower pins 32 projecting forwardly from the rear of the casing to pass through holes provided in the upper and lower flanges 25, 26 provided at top and bottom of the magazines. The pins 32 are mounted on the vertically disposed members 33 of a frame secured to extend lengthwise of the casing at the back as and for the purpose hereinafter described. The lower pins 32, in the vertical members 33, are adjustable for measures, so that magazines of different depths can be used to accommodate slugs of various measures.

The vertically disposed parts 18, 19 of the casing 12 serve as a housing for a carrier 34 (Figs. 1, 3) formed as a flat metal bar or strip which can be moved vertically between the juxtaposed end faces of the magazines 15, 16.

The carrier 34 carries the slug during all the operations of exposure, that is to say, from the beginning of the line to the end. The carrier is of the same thickness as the slug. An adaptor for the carrier will be required for each different line measure.

The carrier 34 is guided by guide-rollers 35 (Figure 3) which are rotatably mounted on the walls of the vertical portions of the casing 12 to bear on the sides of the carrier.

The carrier 34 is provided with a cavity 36 (Fig. 3) at a position near the lower end and a lateral cut out portion or slot 37 in vertical alignment with the cavity 36 in the upper part. For a predetermined distance along one edge extending from the bottom upwardly the carrier is furnished with a rack 38 which is engaged by a pinion 39 (Figs. 3, 4) mounted in the lower part of the casing 12 at a position below the horizontally disposed parts 13, 14 on a shaft 40 mounted externally of the casing in brackets 41 and operated by record strip controlled mechanisms as hereinafter described.

Before the insertion of the magazines 15, 16 into the casing 12 the rack 38 is operated by a hand wheel 42 so that the cavity 36 in the carrier 34 lies centrally of the juxtaposed end faces of the magazines and so that the covers 22, 23 of the magazines are held at their ends at the top and bottom of the cavity 36. A downward travel of the carrier 34 serves slidingly to remove the covers 22, 23 from the end faces of the magazines 15, 16 and permits the outermost slug in the "supply" magazine 15 to move laterally under the action of the feed mechanism into the slot 37 which is moved into alignment by the downward travel of the carrier. In this position the slug is ready for the feed.

It will be understood that the casing 12 is lightproof and that the removal of the covers 22, 23 from the magazines 15, 16 in the manner hereinbefore described permits of the light sensitive slugs being moved into the position ready for exposure without the access of light thereto.

To feed the slug to be exposed from the delivery magazine into the carrier 34 the driving mechanism is operated as described in detail later. The slug is then brought into a position in which the light beam passing through the lens is adapted to be horizontally projected through the horizontal tube 10 on to the light sensitive surface of the slug, an aperture 43 being provided in the rear one of the upper angle members 27 for the purpose.

The carrier 34 carrying a slug 17 in the slot 37 is fed upwardly in variable step by step movements to present in sequence and in predetermined spaced relation unexposed parts of the sensitised face of the slug for exposure to the projected light whereby the images of the selectively positioned characters on the negative are projected in succession in the predetermined order by mechanism under the control of the record strip or pattern, on to the sensitised face of the slug to form justified lines.

The feed movement of the carrier may be controlled electrically as by means of a series of cooperating solenoids 52 (Figs. 3 and 14) disposed on either side of the carrier 34 at a position above the horizontally disposed parts 13, 14 of the casing 12 and adapted to be energised to grip the carrier intermittently in synchronism with the feed under the control of the record strip or pattern. Gear 47 is provided on its under side with cam surfaces designed to close and open a switch connecting a source of energy with a commutator on the main driving shaft 92ª. Commutator 92ª is arranged to make and break contact with two switches supplying current to the two series of solenoids 52 in proper time relation with the movement of carrier 34. This arrangement is substantially the same as with the line strip feed in my co-pending application Serial No. 203,881 which corresponds generally to my British Patent No. 499,859. As shown in Figure 3 the solenoids are mounted on a carrier member 53 pivotally connected to one end of a bell crank lever 54 which is pivotally mounted at 55 on the wall of the casing 12 and at the other end is pivotally connected to a horizontally disposed coupling rod 56. The ratio of the two arms of the bell crank lever will be varied to correspond to the optical ratio of the apparatus. The other end of the coupling rod 56 is connected with a sliding member 55ª connecting by a rod 84ᶜ to one arm of a bell crank lever 84ᵈ, the other arm of said lever being flexibly connected by rod 84ᵉ to lever 84ᶠ pivoted on the machine frame and carrying on its lower end a roller controlled by cam 84ᵍ on the main drive shaft 92ª. A variable movement of this bar 56 is obtained from a variable stop (Figs. 11 and 15) which comprises a number of tapered wedges. This stop is varied according to the width of the character projected or the inter-word space by mechanism under the control of the record strip or pattern as in the machine of U. S. Patent No. 625,998.

It will be noted from Fig. 14 that the solenoids 52 are arranged to contact opposite faces of the carrier 34, and are actuated by duplicate bell crank levers 54 connected to the forked coupling rod 56.

At a position in the lower part of the casing 12 are mounted a set of holding solenoids 57 similar to the solenoids 52 which serve to clamp the carrier 34 in the exposure position of the slug. These solenoids are controlled electrically to grip the carrier immediately after the completion of each upward feed movement and prior to the de-energisation of the solenoids 52, which are then moved downwardly under the control of the bell crank lever 54 to the initial position ready to grip the carrier and move it upwardly in the next feed movement for the following exposure. The step-by-step feed movement of the carrier 34 is continued until the slug has been completely exposed, when other mechanism comes into operation automatically under the control of the record strip or pattern through the gearing 46, 47 and pulley and belt drive 44 to cause the return or downward movement of the carrier.

This downward movement of the carrier 34 at the end of each line of composition is effected by rotation of the shaft 40 on which the pinion 39 is mounted, by means of a belt drive 44 from a horizontally disposed lay shaft 45 carrying at one end a bevelled toothed wheel 46. This wheel 46 is in engagement with a bevelled toothed wheel 47 loosely mounted at the upper end of a vertically disposed shaft 48 which is carried in a sleeve 49 on a bracket 50 secured to the main stand 11 of the apparatus.

The vertical shaft 48 is constantly rotated by worm and wheel drive 51 (Figs. 2, 12 and 13) driven from the main shaft. The constantly rotating shaft 48 carries at its upper end two retardent teeth 90. On the upper surface of the beveled wheel 47 is mounted a pawl 89 which is normally held out of engagement with the teeth 90 by a latch or trip lever 86. When a line of composition on a slug has been completed, the lever 86 is tripped by a device under control of the record strip, and releases the pawl 89 which engages one of the teeth 90 and thus couples the wheel 47 with the shaft 48. Under this drive, the wheel 47 makes one complete revolution at the end of which the catch 86 disengages the pawl. During the said revolution the wheel 46 through the gearing 45, 44, 40, 39, 38 effects the lowering of the carrier 34 to initial position. Upon the underside of wheel 47 may be carried a cam member designed to close a pair of contacts, completing circuit to the sector energizing the solenoids 52 and 57, Fig. 13. This combination is shown diagrammatically in Fig. 33 of British Patent No. 499,859.

This downward movement of the carrier during which the solenoids 52 and 57 are automatically released brings the exposed slug 17 in the carrier back into position between the end faces of the magazines. In this position of the carrier 34 a slug is fed from the delivery chamber into the carrier 34 and the finished slug therein is moved into the receiving chamber by mechanism now to be described.

On the rear walls of the horizontally disposed parts 13, 14 of the casing 12 is mounted in brackets a frame comprising a pair of parallel rods 58, 59.

Mounted on the rods are the transverse vertical members 33 and parallel members 60 (Figs. 2 and 14) disposed adjacent and in pairs on either side of the line of junction between the end faces of the magazines 15, 16, the members 33, 60 extending beyond the rods 58, 59 and being provided at their ends with the pins 32, 63 which extend transversely through the upper and lower flanges 25, 26 of the magazines. The lower pins 63 are adjustable for variation in line measures.

The members 33 are fixed but the members 60 are mounted to slide on the rods 58, 59, the flanges 25, 26 on the magazines 15, 16 being provided with oppositely disposed longitudinal slots 61 for the purpose. Slots 62 are also provided for the purpose in the rear one of the angle members 27.

A pin 63 (Figs. 5, 6) mounted upon the vertical member 60 extends through the slots 61, 62 and also through slots 64, provided substantially in alignment with the slots 61, 62 but shorter in length. The slots 64 are formed in the walls of a channel shaped member 65 mounted to slide between the flanges 25 on the top face of the magazine 15 and carrying at its free end a pawl 66 pivoted at 67 within the member 65 so as to be movable in a vertical plane.

Mounted to slide in the member 65 is an inner member 68 of channel section which is moved by a projecting pin 63. At its inner end the member 68 is formed with opposite cam slots 69 disposed in lateral alignment and within which slide the ends of a pin extending transversely of the member 68, and mounted at the rear end of the pawl member 66. Thus a lateral movement of the member 60 will cause a lateral movement of the pin 63, which serves to carry the inner channel member 68 forward within the member 65, the last part of the movement, due to the slots 64 in the member 65 being shorter than those in the flanges 25 of the magazine 15, causing a forward movement also of the member 65 within the channel formed by the flanges 25 of the magazines.

Figure 6:
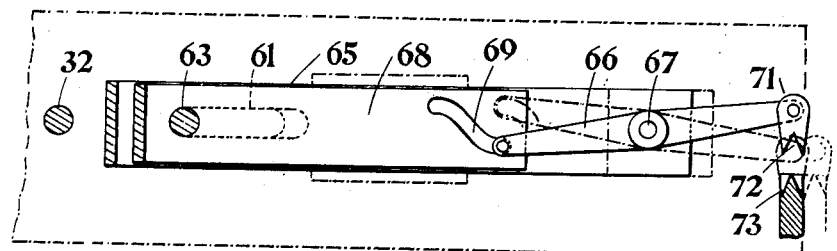
Figure 6 is a section on the line 6—6 of Figure 5.

The first part of the movement during which only the inner member 68 is moved causes the cam slots 69 to move relatively to the pin 70 whereby the pawl 66 is moved on its pivot 67, the final part of the movement during which both the members 65 and 68 are moved together causing the pawl 66 to be moved forward laterally as shown in dotted lines in Figure 6.

The pawl 66 carries a jaw member 71 which in the normal position lies immediately above the end of the outermost slug in the delivery magazine 15, the jaw member 71 being formed with a transverse V-shaped notch 72 which is adapted to engage a correspondingly shaped part 73 on the end face of the slug.

During the final movement of the two members 65, 68 together the pawl 66 moves laterally, and the foremost slug in the delivery chamber is gripped by the jaws 71 of the pawl 66 and moved into the carrier 34.

The pawl 66 only has been described but similar pawls are provided at corresponding positions on the lower side of the delivery magazine 15 and in corresponding positions on the receiving magazine 16, the latter being directed inwardly towards the pawls mounted on the delivery magazine.

To enable the pawl 66 to grip and move a slug into the carrier 34, notches 74 are cut in the top and bottom ends of the recess 37 in said carrier.

The magazines 15 and 16 are similar in construction so as to be interchangeable and act either as a delivery or as a receiving magazine. When a magazine is acting as a receiving one the pawls 66 therein are out of operation and do not operate to engage the "exposed" slug passed from the carrier 34.

A screw-rod 75 operates by means of a knob 76 externally of the casing and mounted centrally of the end of the part 14 of the casing to extend through a hole provided in the stationary member 33 locating the magazine 16 to be secured to the laterally movable member 60 so that by lateral movement of the knob 76 the pawl members 66 mounted on the receiving magazine 16 may be moved into a position so that they do not obstruct the lateral movement of the exposed slug 17 from the carrier 34 between the magazines into the receiving magazine.

Figure 7:
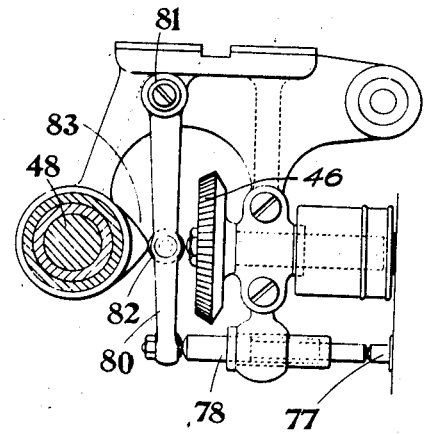
Figure 7 is a detail view of the galley mechanism as adapted for feeding slugs.

The lateral feed movement of the slugs from the delivery magazine 15 into the exposure position and thence into the receiving magazine is effected automatically by driving mechanism under the control of the record strip or pattern. For this purpose a shaft 77 (Figs. 2, 7) mounted on the machine frame is secured to the laterally movable member 60 and passes through a hole in the adjacent member 33 and through the end wall of the horizontally disposed part 13 of the casing 12 to lie in the normal position with the end of the shaft 77 abutting against the end of a shaft 78 mounted in a bracket to slide against pressure of a spring 84 acting against a collar 85 on the shaft. The shaft 78 is moved axially by a pivoted lever 80 one end of which abuts against the end of the shaft 78 and the other end being pivoted at 81 on the machine frame (Figure 7). A cam roller 82 pivotally mounted at an intermediate position on the lever 80, is periodically engaged by a cam 83. This cam is carried on a sleeve fixed to the bevelled tooth wheel 47 (Fig. 4). When the wheel 47 is rotated the movement of the lever 80 under the action of the cam 83 causes axial movement of the shafts 78 and 77 and the member 60 moves the pawl 66 to effect the feed of a slug to the carrier 34.

Should the composition be completed with only part of a slug exposed the downward travel of the carrier containing the partly exposed slug may be effected by hand by operating the rack 38 by means of the hand wheel 42 and pinion 39. Alternatively the lever arm 86 may be tripped by hand to cause engagement between the pawl 89 and the cam 90 to cause the operation of the rack 38 and of the pawls 66 to grip the outermost slug and to feed it forward. This procedure is also followed when ejecting the first slug from the magazine 15, into the carrier when starting composition.

Before the magazines 15, 16 can be removed from the casing 12 it is necessary to apply the covers 22, 23 thereto and for the purpose the rack 38 is operated by hand to move the carrier 34 upwardly beyond the exposure limits of the line and to bring the magazine covers in the unit carrier into engagement with the magazines. The front wall 29 may then be opened and the magazines removed.

As illustrated in Figure 8 the negative holder 91 has two rigid projections or bars 92, 93 of V section on the under surface, one projection or bar 92 of V section being along one side and parallel to the unit rows on the master plate, that is rows of characters of equal width, and the other 93 being at a mid-position at the opposite side and at right angles to the unit rows. Thus the two projections or bars 92, 93 lie at right angles to each other. The projection or bar 92 parallel to the unit rows may be made as shown, in two parts.

The two projections or bars 92, 93 are adapted to engage two series of parallel V-slots 94, 95, formed in two horizontal members 96, 97 respectively, both of which are permanently fixed in one plane above the face of the main stand 11 of the apparatus (Figure 9). The slotted members 96, 97 are separated to leave a space 98 between them. Thus the selected character on the master plate is definitely located in two directions at right angles at the same time.

As previously stated the movements and operations of the apparatus are controlled by a record-strip of the kind described. This record-strip is moved step-by-step in each cycle of the apparatus, over a bar having a series of air ports, selected combinations of which are open to the passage of air by perforations in the record-strip. These air ports are in two main groups. The ports of one group lead by channels to a series of air-operated pins D and the ports of the other group to a similar series of air-operated pins D'. A normal signal in the record-strip to move the master plate 3 to centre a selected character, as previously described, comprises one component related with the pins D and one related with the pins D'. Jaws (not shown) operated for example by cam and lever mechanism close from opposite sides on any pin projected in the group D. Between these jaws is a head F on a rod F' attached to one of the master plate carrier frames. In the closing of the jaws to the selected stop pin D, the rod F' and carrier to which it is attached is thus moved to center the row in which lies the character or symbol to be projected.

Similar jaws close upon any projected pin in the group D'. In closing on a pin these jaws carry with them a head G of a rod G' attached to the second carrier of the master plate, and this carrier is free to slide at right angles to the movement of the first carrier. This movement determines the column to be brought over the lens. Thus the combined movement of the carriers centers the selected character at the projection locus for photographic exposure.

The variable stop hereinbefore mentioned as being comprised of tapered wedges, functions both to determine the extent of movement imparted to the line bar 34 for character, and word spacing. The variable wedge for character spacing comprises the normal wedge A and a coacting transfer wedge C acting against a fixed member $C^3$.

The variable wedge for inter-word spacing is comprised in the normal wedge A, transfer wedge C' and the two justifying wedges B, B' acting against fixed member $C^3$ (Fig. 15).

While adjusting wedges for character spacing, transfer wedge C' is withdrawn from contact with wedge A. For inter-word spacing transfer wedge C is withdrawn and wedge C' contacts wedges A, B' and B.

In inter-word spacing, either or both justifying wedges B', B may be moved, under control of the record strip, to determine the required space movement of the line bar.

The jaws related to pins D' in addition to moving the carrier also act on the normal wedge A by engaging its projection A' to position this wedge in accordance with the width of the character to be projected.

When under the control of the record-strip, the master plate carriers have been moved to center the selected character and this character has been projected on to the sensitized line bar 17, then the bar 56 is drawn by its cam operated lever, against the stop formed by the wedges A and C a distance in accordance with the width of said photographed character.

Each time an inter-word space is to be inserted in the composition on the line bar 17, a port is uncovered by a perforation in the record-strip and air passes to an air operated pin which causes the wedge C to be withdrawn and the wedge C' to be inserted so that the variable stop for the bar 56 is formed by the wedges A, C', B and B'. The wedges B, B' having previously been adjusted to the inter-word space required.

When a line of composition is completed the carrier 34 for a line bar must be returned to initial position to allow a finished line bar to be ejected and a fresh line bar to be placed in the carrier for the next line to be composed. For this purpose a perforation in the record-strip uncovers an air port which results in turning the lever 86 (Fig. 11) to release the pawl 89, carried on the toothed wheel 47, which is loosely mounted on the shaft 48 carrying the ratchet 90. This pawl now engages the ratchet 90 and locks the wheel 47 to the shaft 48, causing said wheel to rotate and through the wheel 47, wheel 46 and gearing operate the wheel 39 which engages the rack 38 to lower the carrier as already described. During this movement the electric circuits for the solenoids 52 and 57, will be broken, the contacts for the circuits being carried on the wheel 47 and shaft 92a.

During the rotation of the toothed wheel 47, the cam 83 carried thereby will act on the mechanism already described to feed a fresh slug from the delivery magazine into the carrier and push the completed line bar into the receiving magazine.

Before any perforations in the record-strip for positioning the master plate 3 reach the air ports to raise pins D, D' at the commencement of a fresh line of composition, perforations are presented to set the justification stop for the bar 56. One perforation in the record strip serves to displace the normal transfer wedge C from operative engagement with normal wedge A, while a second perforation places in operative position the justifying transfer wedge C'. One or two perforations, as may be necessary for the justifying space requirement, serve to raise through pins either or both justifying wedges B, B' to bring either or both their lugs $B^3$, $B^2$ into the path of the jaws related to pins D'.

The closing of said jaws combines the normal, justifying and justifying transfer wedges into a stop or gage for bar 56, for the justification spacing of the line to be composed.

The invention consists in the novel elements and combinations as pointed out in the accompanying claims, and it will be understood that departures may be made from the specific forms shown and described without departing from the principles of the invention and without sacrificing its chief advantages.

I claim:

1. A mechanism for photographically composing text matter in separate lines, including in combination means for selectively presenting typographic characters of various widths singly at an exposure locus, a carrier for a line-unit bar having a light-sensitive surface, means for supplying and positioning a line-unit bar in the carrier, means for impressing the presented characters on the light-sensitive surface of the bar by light action, and means for variably advancing the carrier relatively to the exposure locus correspondingly to the width of each character photographed.

2. A mechanism for photographically composing text matter in separate lines, including in combination record strip controlled means for selectively presenting typographic characters of various widths singly at an exposure locus, a carrier for a line-unit bar having a light-sensitive surface, means for supplying and positioning a line-unit bar in the carrier, means for impressing the presented characters on the light-sensitive surface of the bar by light action, and record strip controlled means for variably advancing the carrier relatively to the exposure locus correspondingly to the width of each character photographed.

3. A mechanism for photographically composing text matter in separate lines, including in combination record strip controlled means for selectively presenting typographic characters of various widths singly at an exposure locus, a carrier for a line-unit bar having a light-sensitive surface, means for supplying and positioning a line-unit bar in the carrier, means for impressing the presented characters on the light-sensitive surface of the bar by light action, record strip controlled means for variably advancing the carrier relatively to the exposure locus correspondingly to the width of each character photographed, and record strip controlled means for returning the carrier to initial position.

4. A mechanism for photographing typographical characters in justified lines, including in combination a light-proof delivery magazine for line-unit bars having a light-sensitive surface, a light-proof receiving magazine for the line-unit bars, said magazines each having an open end through which the line bars may be moved, a line-unit bar carrier, means for delivering a line-unit bar from the delivery magazine to said carrier, means for photographing a line of typographic characters on the light-sensitive surface of a line-unit bar while in the carrier and means for transferring the exposed line-unit bar to the receiving magazine, said magazines being supported in end to end relation and closely adjacent to each other extending oppositely from the line unit bar in the carrier.

5. A mechanism for photographing typographical characters in justified lines, including in combination a light-proof delivery magazine for line-unit bars having a light-sensitive surface, a light-proof receiving magazine for the line-unit bars, a line-unit bar carrier, means for photographing the line of typographic characters in a plurality of exposures on different portions of the light-sensitive surface of a line-unit bar while in the carrier, means for delivering line-unit bars singly from the delivery magazine to said carrier and means for transferring the exposed line-unit bars singly to the receiving magazine and maintaining them in page form.

6. A mechanism for photographing typographical characters in justified lines, including in combination a light-proof delivery magazine for line-unit bars having a light-sensitive surface, a light-proof receiving magazine for the line-unit bars, a line-unit bar carrier, means for photographing typographic characters one at a time on the light-sensitive surface of a line-unit bar while in the carrier, means for advancing the carrier between successive exposures, means for delivering line-unit bars singly from the delivery magazine to said carrier, and means for transferring the exposed line-unit bars singly to the receiving magazine and maintaining them in page form.

7. A mechanism for photographing typographical characters in justified lines, including in combination a light-proof delivery magazine for line-unit bars having a light-sensitive surface, a light-proof receiving magazine for the line-unit bars, a line-unit bar carrier, record strip-controlled means for photographing typographic characters one at a time on the light-sensitive surface of the line-unit bar while in the carrier, record strip-controlled means for variably advancing the carrier relatively to the photographing locus correspondingly to the width of each character photographed, means for supplying line bars singly from the delivery means to said carrier preparatory to photographing, means for transferring the exposed line-unit bars singly to the receiving magazine after photographing and record strip-controlled means for returning the carrier to initial position.

8. A mechanism for photographing typographical characters in justified lines, including in combination a light-proof delivery magazine for line-unit bars having a light-sensitive surface, a light-proof receiving magazine for the line-unit bars, a line-unit bar carrier, record-strip controlled means for delivering a line-unit bar from the delivery magazine to said carrier, means for photographing a line of typographic characters in a plurality of exposures on different portions of the light-sensitive surface of a line-unit bar while in the carrier and record-strip controlled means for transferring the exposed line-unit bar to the receiving magazine.

9. A mechanism for photographically composing text matter in separate lines, including in combination a movable master plate bearing a plurality of typographic characters, mechanism for positioning said plate for the exposure of a selected character, a carrier for a line-unit bar, mechanism for initially positioning a blank line-unit bar in the carrier, and mechanism for variably advancing the carrier step-by-step relatively to the exposure position according to the width of each character photographed including means for intermittently gripping and advancing the carrier.

10. A mechanism for photographically composing text matter in separate justified line-units including in combination a master plate bearing a plurality of typographic characters, mechanism for selectively moving the master plate to center a selected character at an exposure position, a carrier for a line-unit bar, mechanism for variably advancing said carrier step by step relatively to the exposure position for each character to be photographed and mechanism for variably advancing the carrier for each inter-word space in a composed line, means for feeding a line unit bar transversely to the line of movement of the carrier and means for delivering a line unit bar from the carrier and transversely to the movement of the carrier.

11. A mechanism for photographically composing text matter in separate justified lines including in combination a movable master plate bearing a plurality of typographic characters, record-strip controlled mechanism for moving said plate to position a selected character for photographic exposure, a carrier for a line-unit bar, record-strip controlled mechanism for feeding a line-unit bar into said carrier, record-strip controlled mechanism for variably advancing said carrier step by step according to the value of each character, and record-strip controlled mechanism for variably advancing the carrier for inter-word spaces, said record strip controlled mechanisms operating on the carrier through intermittently operated electromagnetic clutch means.

12. A mechanism for photographically composing separate justified lines of text matter including in combination a master plate bearing a plurality of typographic characters, mechanism for automatically and selectively moving the master plate to center a selected character at an exposure position, a carrier for a line-unit bar including means for holding and feeding the line unit bar by engagement with its ends, mechanism for placing a line-unit bar in said carrier, mechanism for variably advancing the carrier step by step through said exposure position and mechanism for returning the carrier to initial position.

13. A mechanism for photographically composing separate justified lines of text matter, including in combination a master plate bearing an assemblage of single characters, record-strip controlled mechanism for selectively moving the master plate to center a selected character over an exposure position, a carrier for a line-unit bar, record-strip controlled mechanism for feeding a line-unit bar to the carrier, record-strip controlled mechanism for variably advancing the carrier relatively to the exposure position and transversely to the feeding of the line unit bar to the carrier and record-strip controlled mechanism for returning the carrier to initial position and means for delivering a line unit bar from the carrier transversely to the movement of the carrier.

14. A mechanism for photographically composing text matter in separate lines including in combination a movable master plate bearing an assemblage of separate characters, mechanism for moving the master plate in two directions in one plane to center a selected character for photographic projection, a magazine having delivery and receiving compartments for separate line-unit bars, a carrier for a single line-unit bar mounted to move between the compartments of the magazine, mechanism for variably advancing the carrier step by step, mechanism for returning the carrier to initial position and mechanism for feeding a fresh line-unit bar into the carrier and removing a composed line-unit bar therefrom.

15. A mechanism for photographically composing text matter in separate lines including in combination a movable master plate bearing an assemblage of separate characters, a record-strip controlled mechanism for selectively positioning a character thereon for photographic exposure, a magazine having delivery and receiving compartments for separate line-unit bars, a carrier for a single line-unit bar movable between said compartments, record-strip controlled mechanisms for variably advancing the carrier step by step, record-strip controlled mechanism for returning the carrier to initial position, and record-strip controlled mechanism for ejecting a complete line-unit bar from the carrier.

16. A mechanism for photographically composing text matter in separate lines, including in combination a master plate bearing a plurality of typographic characters, mechanism for moving the master plate in two directions in one plane to center a selected character thereon for photographic exposure, a magazine having delivery and receiving compartments for line-unit bars, a carrier for a line-unit bar mounted between said compartments, mechanism for variably advancing the carrier step by step, mechanism for returning the carrier to initial position, feeding and holding pawls for a line-unit bar in said delivery compartment and mechanism for operating said feeding pawls to deliver a unit bar into the carrier.

17. A mechanism for photographically composing text matter in separate lines, the combination of a master plate bearing an assemblage of typographic characters and symbols, mechanism for selectively moving the master plate in two directions in one plane to center a selected character for photographic exposure, a carrier for a line-unit bar, a driving mechanism for advancing the carrier step by step, a variable stop for said driving mechanism, and mechanism for returning the carrier to initial position.

18. A mechanism for photographically composing text matter in justified lines including in combination a master plate bearing a plurality of typographic characters, record-strip controlled mechanism for selectively moving the master plate in two directions in one plane to center a selected carrier for photographic exposure, a locking device for the master plate, mechanism for moving the master plate into engagement with the locking device, a carrier for a single line-unit bar, driving mechanism for advancing the carrier step by step relatively to the exposure position, a variable stop for said driving mechanism, record-strip controlled mechanism for adjusting and setting the variable stop, record-strip controlled mechanism for returning the carrier to initial position and record-strip controlled mechanism for feeding a line-unit bar to the carrier.

19. A mechanism for photographically composing text matter in separate lines, including in combination a record-strip controlled movable master plate bearing a plurality of typographic characters, a magazine having delivery and receiving compartments for separate and independently movable line-unit bars, record-strip controlled mechanism for variably advancing a line-unit bar step by step between said compartments, feeding pawls in the delivery compartment, gearing for returning the carrier to initial position, a cam for operating said pawls, and a record-strip controlled trip device for initiating the operation of said gearing and cam.

GEORGE WESTOVER.